Figures 1, 2, 3:
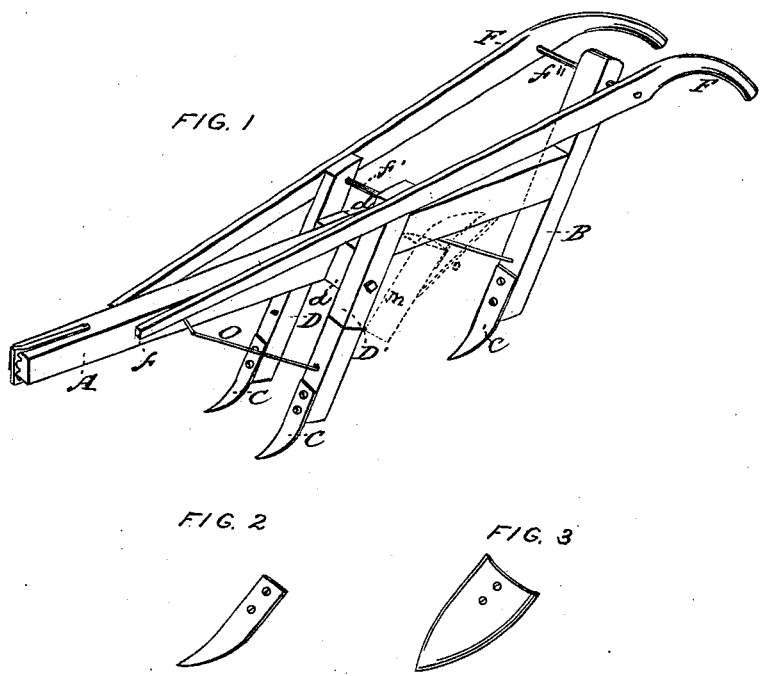

WALTER & BUSHMAN.
Cultivator.

No. 108,857. Patented Nov. 1, 1870.

WITNESSES:

INVENTORS:
John A Walter
Eli Bushman.
PER — attorneys.

UNITED STATES PATENT OFFICE.

JOHN A. WALTER AND ELI BUSHMAN, OF WHITE HOUSE, PENNSYLVANIA.

IMPROVEMENT IN CORN-PLOWS.

Specification forming part of Letters Patent No. 108,857, dated November 1, 1870.

*To all whom it may concern:*

Be it known that we, JOHN A. WALTER and ELI BUSHMAN, of White House, in the county of Cumberland and State of Pennsylvania, have invented a new and Improved Corn-Plow; and we do hereby declare the following to be a full, clear, and exact description of the same, reference being had to the accompanying drawings, making a part of this specification, in which—

Figure 1 is a perspective view of the plow. Fig. 2 is a similar view of one of the narrow shovels detached. Fig. 3 is a similar view of one of the broad shovels detached.

Our invention pertains to an improved construction of corn-plows; and it consists in the arrangement, with a plow-frame, of front standards so hinged as to fold backward and be secured in that position by rods, which also answer the purpose of draft-rods when the standards resume their normal position, all as hereinafter described.

In the drawings, A is the main beam, abutting against the inclined rear standard, B, to which it is attached by tenon and mortise, and D D' are the forward standards, attached to the sides of the beam directly opposite to each other by means of blocks *d* and bolts *e*.

F F are the handles, bolted to the sides of the beam at *f*, and fastened to the tops of standards D D' by means of a rod, *f'*, and to the top of standard B by means of another rod or cross-bar, *f''*.

C C are the shovels, attached to the lower ends of standards B D D', in the usual manner, and being either narrow, as shown in Fig. 2, or broad, as seen in Fig. 3, according to the nature of the work required, on any particular occasion, of the plow.

The general construction and arrangement of the plow being as above described, we make the standards D D' in two parts, articulated together in such a manner that the lower part can be turned up backward out of the way and fastened in that position, as seen in dotted lines *m m*.

O is a brace or draft-rod hooking to a staple in the side of the beam, near the point *f*, to keep the lower ends of the standards from turning back when at work. The same rod (seen in dotted lines at *o*) is employed to fasten the part *m* up out of the way when turned back, a staple being provided for the purpose near the rear end of the beam.

As thus constructed, this plow is capable of ready and easy adjustment to the different kinds of work required of it.

First. When arranged as shown in the drawings, it constitutes what farmers sometimes denominate a "corn-fork," and is adapted for working corn when very small, cleaning out the grass between the rows, and loosening up the ground.

Secondly. By taking off the narrow shovels, putting on the broad ones, and turning up one front shovel, we have a double-shovel plow adapted to throw the dirt round the corn. It matters not which shovel is turned up—if the right one, we have a left-hand plow, and if the left one we have a right-hand plow.

Thirdly. Both front shovels can be turned up, and then we have a single-shovel plow for marking corn-ground to drop by hand, or plowing out potatoes, or breaking up new ground among stumps, &c. The instrument can be used with single or double team, as desired.

Having thus described our invention, what we claim as new, and desire to secure by Letters Patent, is—

The standards D D', articulated so as to fold backward, and provided with the draft-rod O, whereby they are secured in the vertically inclined or folded position, arranged with the beam A, standard B, and handles F, as shown and described.

To the above specification of our invention we have signed our names this 19th day of September, A. D. 1870.

JOHN A. WALTER.
     ELI BUSHMAN.

Witnesses:
 A. L. SPONSLER,
 GEORGE F. HOFMANN.